United States Patent
Dermitzakis

[19]

[11] Patent Number: 6,039,270
[45] Date of Patent: Mar. 21, 2000

[54] MANUFACTURE PROCESS FOR A DRIPLINE DUCT WITH INTERNALLY LOCATED EMITTERS

[76] Inventor: Emmanuil Dermitzakis, 16-18 Papada Street, Athens 11525, Greece

[21] Appl. No.: 08/949,113

[22] Filed: Oct. 10, 1997

Related U.S. Application Data

[62] Division of application No. 08/390,670, Feb. 17, 1995, Pat. No. 5,676,897, which is a division of application No. 07/858,966, filed as application No. PCT/GR91/00012, Oct. 2, 1991, abandoned.

[30] Foreign Application Priority Data

Oct. 3, 1990 [GR] Greece ................................ 900100727

[51] Int. Cl.[7] .................................................. B05B 15/00
[52] U.S. Cl. ............................................................ 239/542
[58] Field of Search .......................... 264/171.11, 171.27, 264/149, 150; 239/542

[56] References Cited

U.S. PATENT DOCUMENTS

| | | | |
|---|---|---|---|
| 3,895,085 | 7/1975 | Suzuki et al. ............................ | 264/154 |
| 3,917,169 | 11/1975 | Harmony ............................. | 239/542 X |
| 4,307,841 | 12/1981 | Mehoudar et al. ..................... | 239/542 |
| 4,366,926 | 1/1983 | Mehoudar ............................... | 239/542 |
| 4,369,923 | 1/1983 | Bron ....................................... | 239/542 |
| 4,735,363 | 4/1988 | Shfaram et al. ........................ | 239/542 |
| 5,282,916 | 2/1994 | Bloom .................................. | 156/244.13 |
| 5,324,371 | 6/1994 | Mehoudar .................................. | 156/64 |
| 5,324,379 | 6/1994 | Eckstein ............................. | 156/244.13 |

FOREIGN PATENT DOCUMENTS

| | | | |
|---|---|---|---|
| 2395915 | 3/1979 | France ................................... | 264/209 |
| 1389971 | 4/1975 | United Kingdom ................... | 239/542 |
| 484446 | 5/1975 | United Kingdom ................... | 239/542 |

*Primary Examiner*—Kevin Weldon
*Attorney, Agent, or Firm*—Webb Ziesenheim Logsdon Orkin & Hanson, P.C.

[57] ABSTRACT

A dripline duct with internally attached emitters is provided for irrigation. The duct is preferably plastic and continuous but does not have a constant cross-section along its length. The emitter may be auto-adjusting for securing a constant supply at a particular area of water pressures. The emitters are placed in the interior of the duct at its production phase and are covered almost totally by the wall of the duct which is swollen at the location of the emitters.

5 Claims, 13 Drawing Sheets

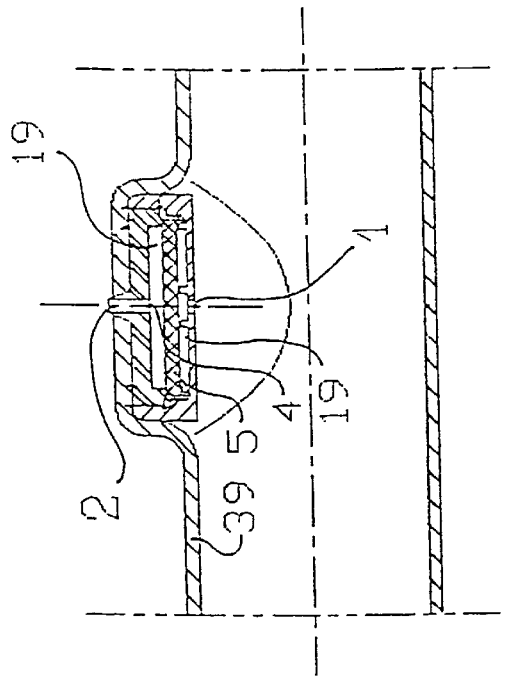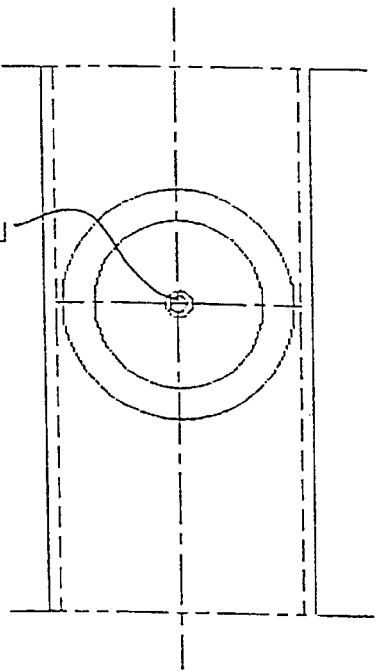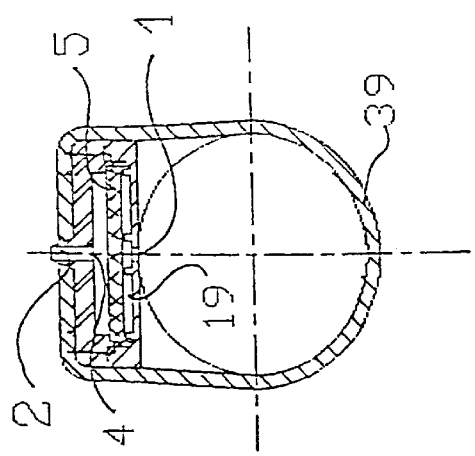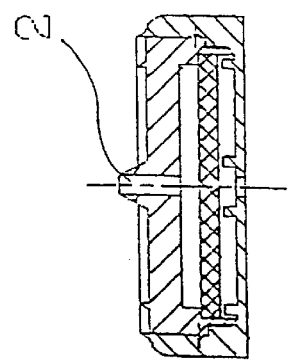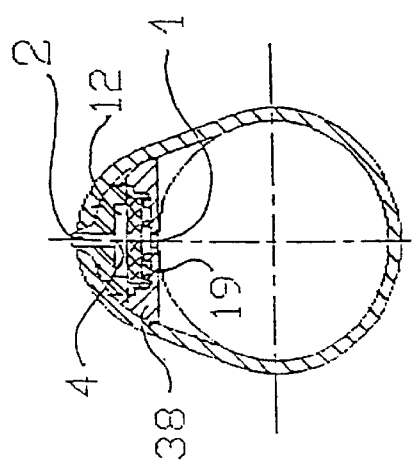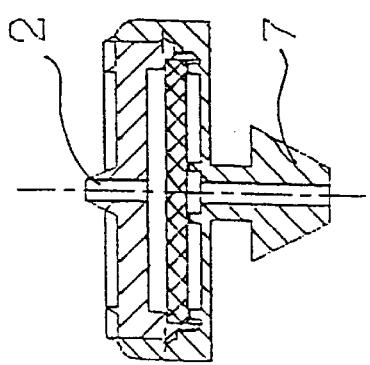

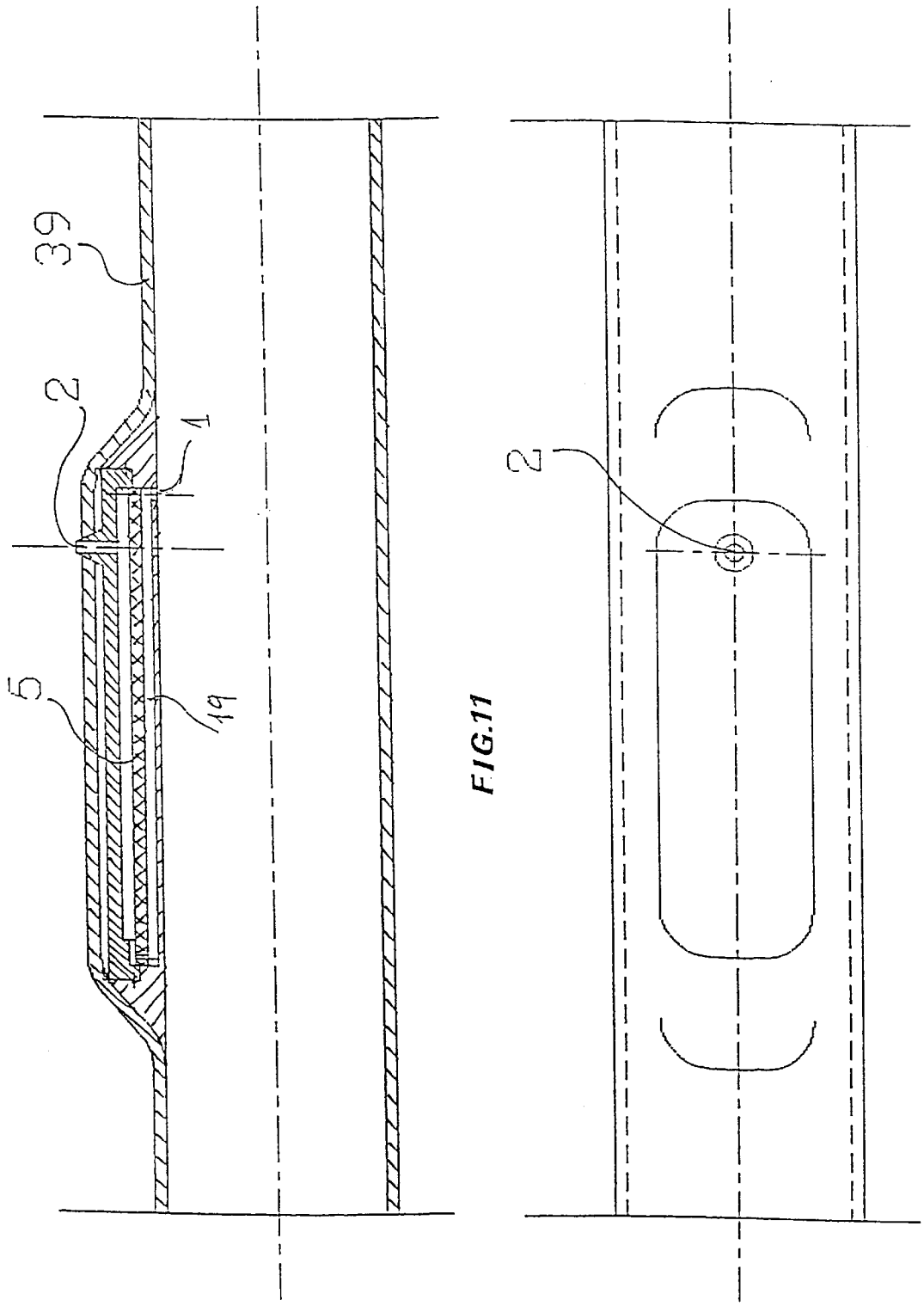

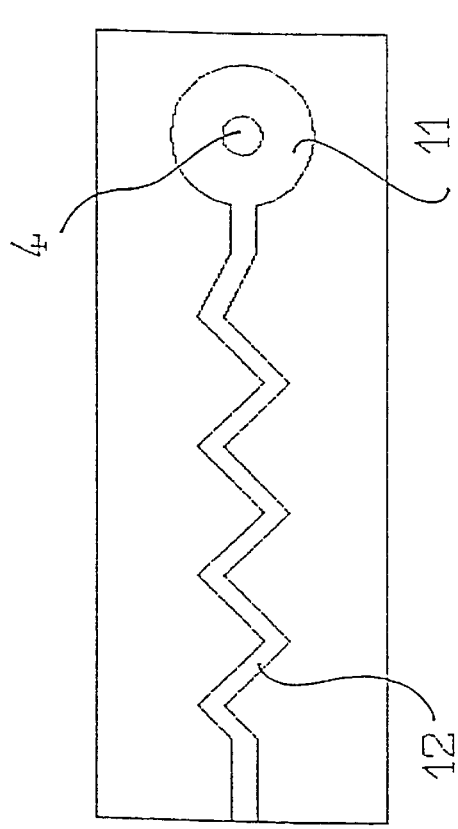
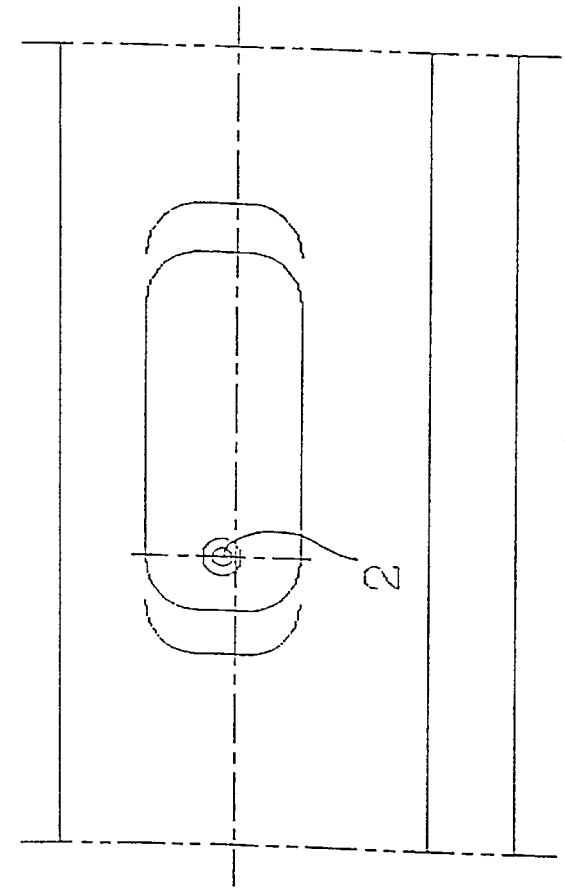
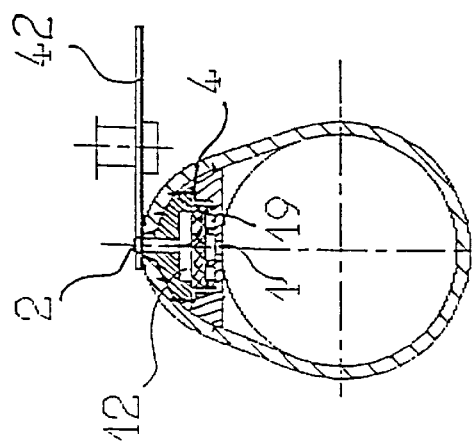
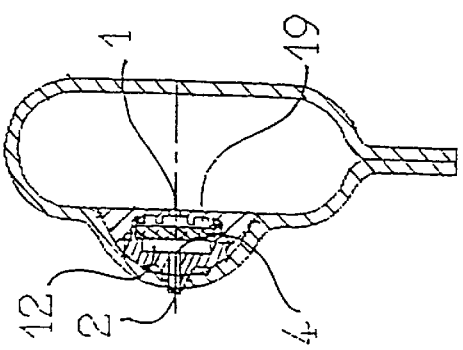

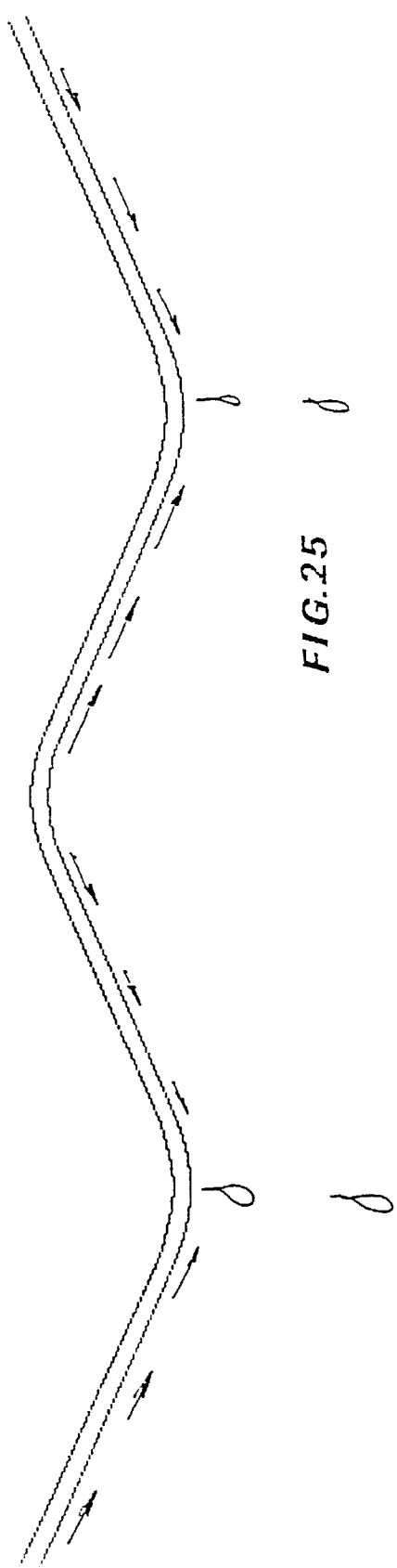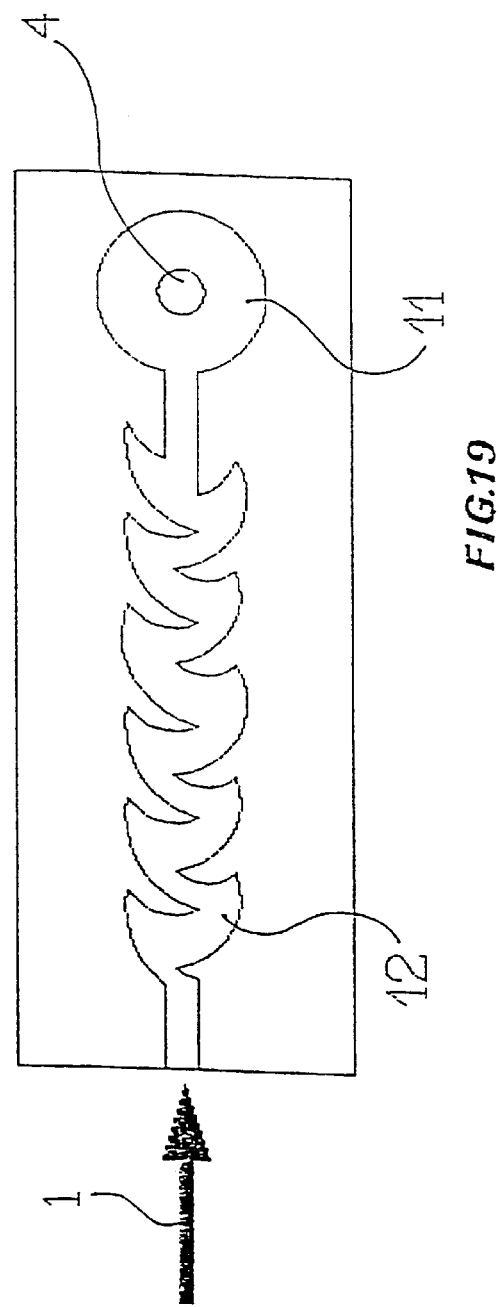

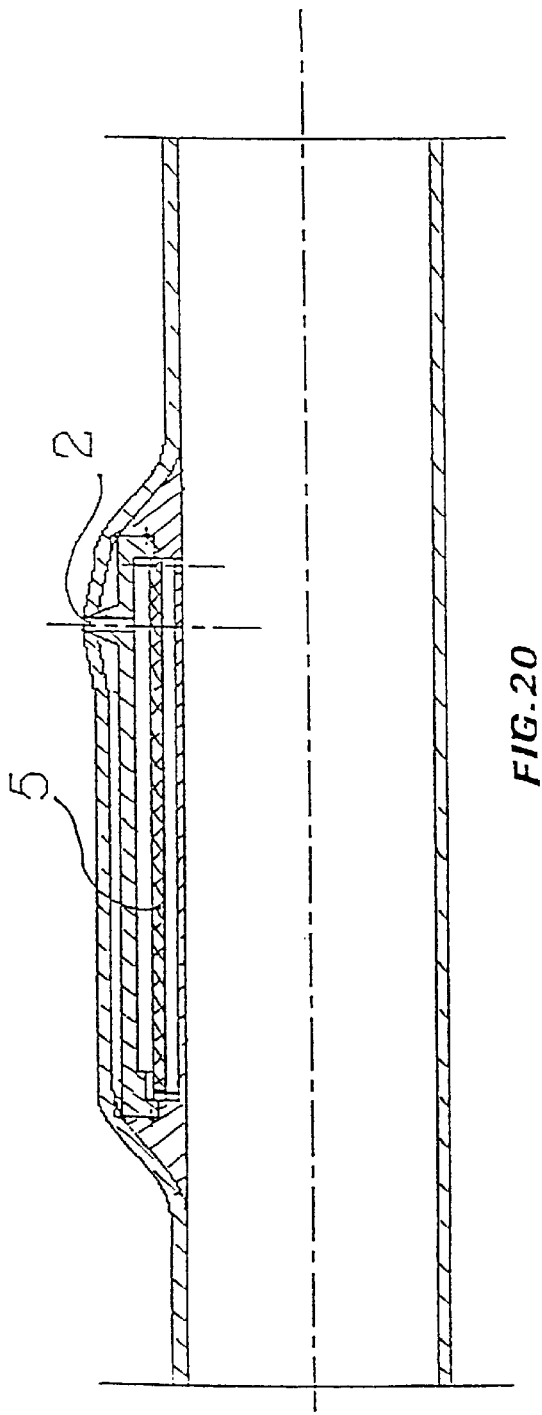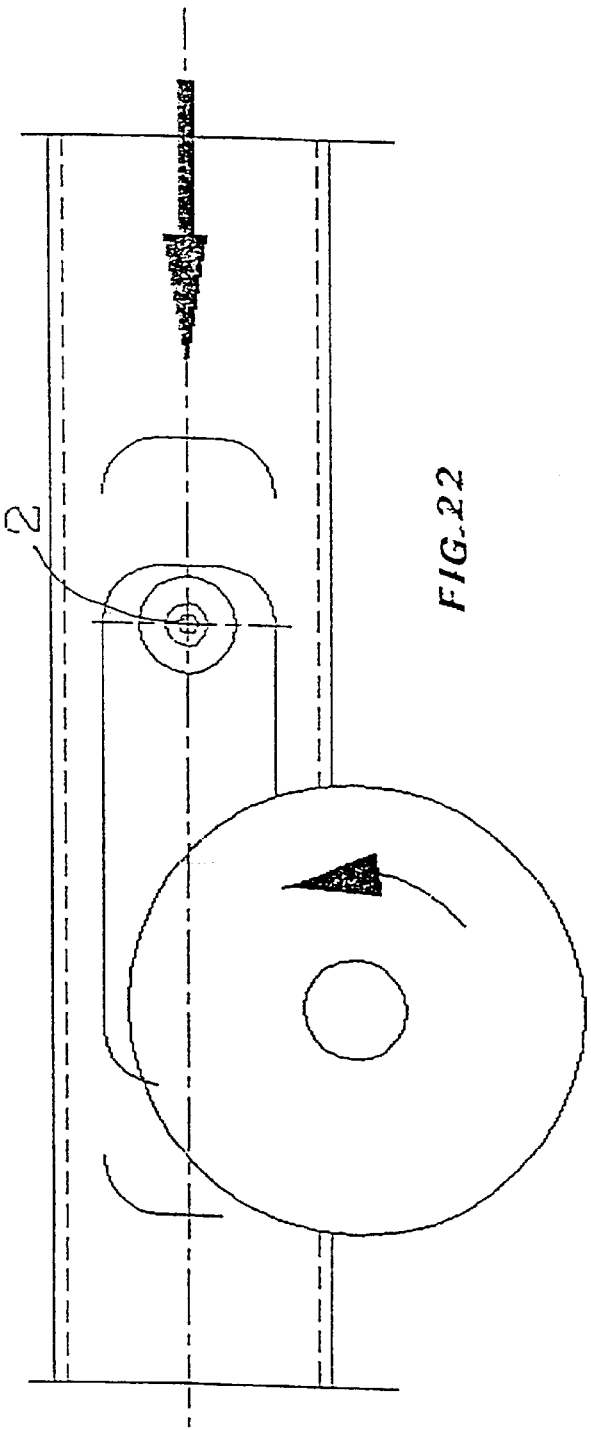

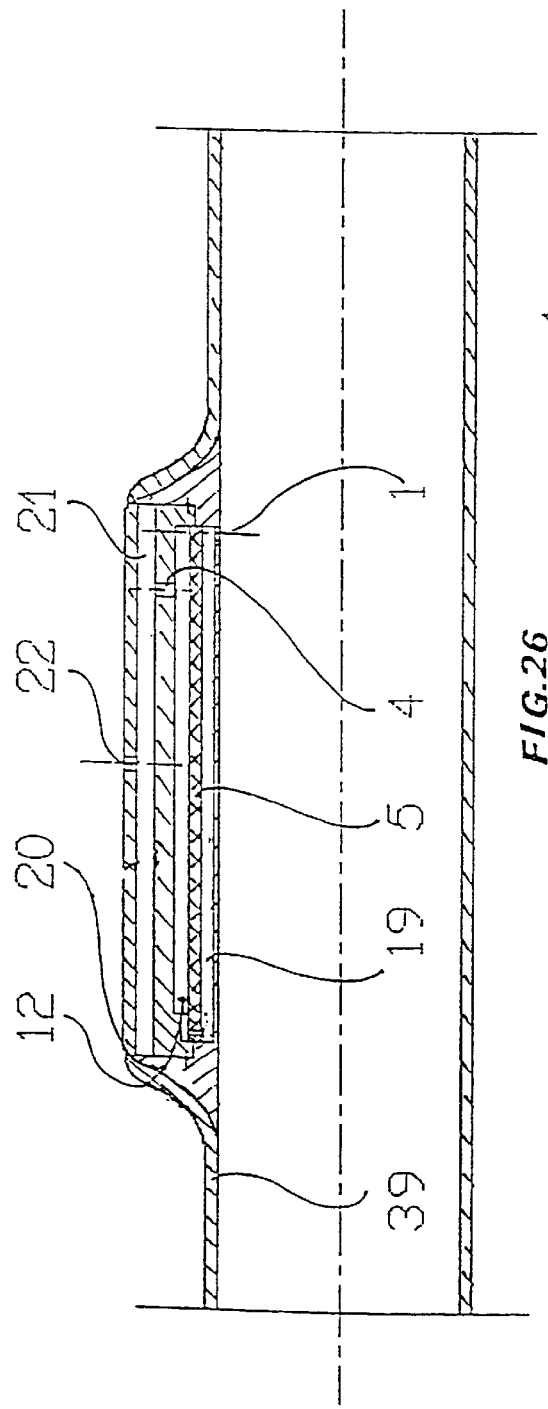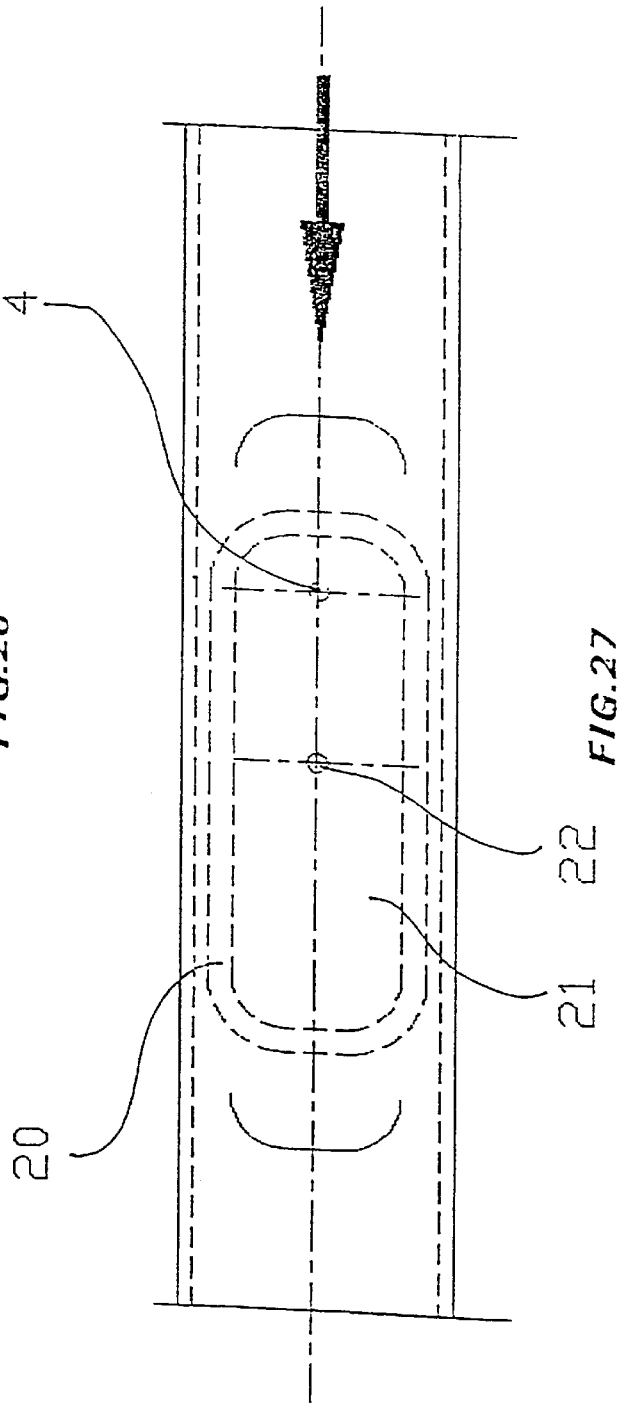

ated application of U.S. patent application Ser. No. 08/390,670 filed Feb. 17, 1995, now U.S. Pat. No. 5,676,897 which is a divisional application of U.S. patent application Ser. No. 07/858,966, filed May 13, 1992, now abandoned, which is the national phase of International Application No. PCT/GR91/00012 filed on Oct. 2, 1991 and designating, inter alia, the United States. The disclosures of U.S. patent application Ser. Nos. 07/858,966 and 08/390,670 and International Application No. PCT/GR91/00012 are herein incorporated by reference.

MANUFACTURE PROCESS FOR A DRIPLINE DUCT WITH INTERNALLY LOCATED EMITTERS

CROSS REFERENCE TO RELATED APPLICATIONS

This application is a divisional application of U.S. patent application Ser. No. 08/390,670 filed Feb. 17, 1995, now U.S. Pat. No. 5,676,897 which is a divisional application of U.S. patent application Ser. No. 07/858,966, filed May 13, 1992, now abandoned, which is the national phase of International Application No. PCT/GR91/00012 filed on Oct. 2, 1991 and designating, inter alia, the United States. The disclosures of U.S. patent application Ser. Nos. 07/858, 966 and 08/390,670 and International Application No. PCT/GR91/00012 are herein incorporated by reference.

The invention concerns a dripline duct with internally and at spaced apart intervals located emitters. The duct is plastic, continuous but does not have constant cross-section along its length. This is the case because the emitters are sunk internally in the pipe wall, swelling it locally. The final cross-section of the dropline duct is completely free and presents the hydraulic resistance of a simple smooth pipe. The dripline duct has outlet apertures at spaced apart intervals corresponding to the emitters which are used for the outlet of water in the form of drips. It is supplied, usually together with many other dripline ducts, by a larger central conduit. The intervals between the outlet apertures and, consequently, the emitters are defined according to the type of culture and the soil.

There are several dripline ducts with emitters adjusted and internally located in a continuous pipe:

There is a type of dripline duct where the emitter is composed of a cylindric body which has a meandering form in its external coat which is used for pressure reduction and adjustment of water supply (FIG. 1, FIG. 2) and an auto-adjusting part 35 in its internal coat which is used for constant water supply in a particular area of pressures (FIG. 1, 35).

Another type uses significantly smaller emitters 35, internally located in a continuous pipe of constant symmetrical cross-section. The emitters are also auto-adjusting, with a flow adjustor of membrane type, for constant water supply in an area of pressures (FIG. 3 and FIG. 4). The emitters project in the interior of the duct.

Another type uses emitters in the form of part of cylinder, which however cover an important part of the internal periphery of a duct of constant and symmetrical cross-section, in which they are located. This type also uses flow adjustor with membrane for constant flow, which projects in the interior of the duct.

In all these types, the emitter is either cylindric or has a cylindric coupling surface and is entered in a duct of constant and symmetrical cross-section at the phase of duct manufacture.

Apart from these types, there is also a large number of independent emitters which have meandering stroke for pressure decrease or are auto-adjusting with flow adjustor of different types (FIG. 7, FIG. 8, FIG. 9). The emitters of this type are attached to the duct externally, mechanically, through a hole made on the duct after the manufacture phase and through a thin and fragile end-pipe 7, which is located on the emitter.

All the above types of dripline ducts present the following disadvantages:

1) In the type of FIG. 1 and FIG. 2, with the internal cylinder-emitter, there is a great waste of material. Particularly when it is converted to auto-adjusting type by adding a flow adjustor 35, its cylindric surface is not used. Moreover, the internal water pressure of the duct tends to detach the emitter from the duct.

2) The type of FIG. 3 and FIG. 4 has relatively small dimensions. However, because it is internally attached to a duct of constant cross-section, it projects significantly within the pipe itself and decreases significantly the cross-section of water passage at the points of attachment, resulting in significant hydraulic resistance and decrease of water pressure along the duct. This results in a great lack of uniformity in supply between the first and the last emitter of the irrigation line. Thus, the maximum permitted length of the dripline duct is decreased significantly, namely the length of application of the dripline duct where the first compared to the last emitter present a difference in supply of $\leq 10\%$. This disadvantage is important and significant in non auto-adjusting dripline ducts. However, even when the emitter is auto-adjusting, namely it has a flow adjustor and can balance the created differences in pressure so that the supply remains constant (FIG. 31), there would still be need to increase very much the pressure of system operation, resulting in increased costs of energy in water pumps, much larger pressure and, consequently, decrease of the life span of the total irrigation system (eg. pumps, central network, filters, parts, emitters etc).

In order to understand the extent of decrease of the active cross-section by the addition of the emitter, we give examples. We particularly refer to the case of auto-adjusting emitters where due to the addition of eg an elastic membrane for the automatic flow adjustment, the dimensions of the duct are significantly increased:

From a detailed market research, we found that the smaller (in size) auto-adjusting emitter has the following cross-section: height 6 mm×width 5.5 mm=33 square mm and the largest one: height 6 mm×width 11 mm×66 square mm. (The length of the emitters varies from 30 to 45 mm). When these emitters are attached to a duct of external diameter of $\phi 16$ mm and wall thickness of 1 mm, namely of internal cross-section of 154 square mm. The active cross-section of the duct is decreased from $$21.4\% \left( \frac{33 \text{ SQUARE mm}}{154 \text{ SQUARE mm}} \right)$$

to $$42.8\% \left( \frac{66 \text{ SQUARE mm}}{154 \text{ SQUARE mm}} \right)!!.$$

In this disadvantage is made worse by the hydraulic resistances due to the shape of the emitter itself. Let us now examine then dripline duct which presents the largest decrease in cross-section. For instance, we take a supply per emitter equal to 3.5 lit/h and an interval from emitter to emitter equal to 0.30 m. Then, in a dripline duct of a length of 100 m, there would be 300 emitters in total. By virtue of calculations, measurings or date from the manufacturing companies, there would be a difference of 40 m WC (meters of water column) in the water inflow between the first and the last duct of the line of 100 m!!. In other words, the dripline duct, in this length of 100 m, would have a decrease of 40 m WC in pressure. If we assume that the emitter has the characteristic curve of FIG. 31, the irrigation line could satisfactorily operate from the point of view of uniformity even at this length of 100 m. However, the pressure at the beginning of the dripline duct should be increased to 40 m WC instead of 15 m WC which is considered to be an economical operation pressure for emitters and water distributors in general. Namely, there would be an excess of 25 m WC in the operation pressure in the total network, with correspondent waste of energy, more expensive parts, pipes etc, greater risk of leaks and more difficult maintenance. Furtherdown, at the description of our own emitter (pp 16, 17), we will refer to the numerical data of this example for comparison.

Another important disadvantage is the very small welding surface of the emitter with the internal coat of the duct. Particularly in the case of the dripline duct of the type of FIG. 3 and FIG. 4, the welding and the contact in general is done only along the projected edges of a closed and thin line. At the area in the interior of this closed line, there is a pressure equal to atmospherical pressure. The water is lead out of this area by perforation of the duct. At the area in the exterior of this thin closed line, there is high pressure of water of the duct (approximately 40 m WC). Thus, it is apparent that, if the welding of this closed line is dammaged at only one point, this would result in dammaging the operation of the emitter.

3) The type which uses an important part of a cylinder (FIG. 5 and FIG. 6) with flow adjustor as an emitter also presents waste of material and even greater decrease of the cross-section of the tube.

4) All the above systems FIG. 1, FIG. 2, FIG. 3, FIG. 4, FIG. 5, FIG. 6, are characterised by the fact that the duct is continuous, has a constant and symmetrical cross-section and that the emitters are entered internally by angular heads similar to those used for the manufacture of electric cables. Moreover, in these systems, the emitters are attached on the smooth internal surface of the duct and, consequently, are totally covered and cannot be seen from the outside. A great disadvantage of these systems is the very high cost of machinery required for detecting and locating the internal emitter and for the rapid and totally synchronised perforation of the duct exactly on the respective points of water outflow in the emitter. Because all these processes should be done without interrupting the production of the duct which runs at 20–40 m/lt.

5) The externally smooth dripline ducts (FIG. 1, FIG. 2, FIG. 3, FIG. 54, FIG. 5, FIG. 6) also present the phenomenon that the exiting drips lock the duct externally if they are installed in grounds with hypsometric differences or even in flat grounds with small topographic differences. The drips are assembled at the lower point of the curve of the dripline duct (FIG. 25), regardless of their real outflow points, with dammaging results in the case of small new plants.

6) All the other types of dripline ducts where the emitters are not entered in the duct at the phase of its projection, but are externally attached on the duct afterwards (FIG. 7, FIG. 8, FIG. 9) project externally, present difficulties at packaging and coiling in rolls, resulting in great number of emitters being broken and detached. However, their greatest problem is the mechanical resistance and friction presenting at assembling, pulling and coiling in rolls by motorised reels attached to the P.T.O. of the agricultural tractors. Today, reels of this type are the most modern system of coiling and uncoiling for large irrigated areas. Throughout the irrigation period, grass and weeds are selectively gathered around the emitters. The above, in conjunction with the mechanical resistance in rocks and earth as well as friction on the ground at pulling make their assembling and coiling impossible at the end of the irrigation period.

Another important disadvantage of these dripline ducts is that their emitters should have minimal size so as not to make their coiling and pulling difficult. This fact limits their functioning because their should be made meandering strokes of very small length and cross-section, resulting in emitters being very sensitive to obstructions. The problem is particularly obvious in the dripline ducts of the type of FIG. 9, where the whole mechanism of water pressure reduction as well as the membrane in its auto-adjusting version are literally jammed at the neck 36 of the end-tube 7 which is also used for its attaching to the tube.

7) All the above types FIG. 1, FIG. 2, FIG. 3, FIG. 4, FIG. 5, FIG. 6, characterised by the smooth and continuous duct, have another disadvantage: the emitters which can be entered in the duct are very particular concerning the size, the geometrical form and the way of operation, excluding all other types in the market. The following paradox is noted: while as a system (the constant and externally smooth duct with the internally located emitters) is the most successful one, there are other emitters which, if examined individually as emitters, are more successful and reliable than the respective emitters which can be internally attached in a tube at the production phase. Because the above emitters of the dripline ducts of FIG. 7, FIG. 8, FIG. 9 could, until now, be attached to the duct only externally and through a thin and fragile end-tube 7 (FIG. 7,7, FIG. 8,7, FIG. 9,7, FIG. 16,7), due to their installation, now present the problems we mentioned in the previous paragraph 6 and are excluded from the market of surface cultivations, even though their technology is simple and safe and are produced by all small industries. Thus, in the huge market of surface cultivations, only the other types (FIG. 1, FIG. 2, FIG. 3, FIG. 4, FIG. 5, FIG. 6) prevail, where their special emitters are internally attached to the duct and are manufactured only by large industrial units, due to the high investment for the detection of the emitters and the perforation of the duct.

Our system for irrigation provides an emitter entered and internally attached in a plastic tube at its production phase. The emitters are entered one by one through an angular head similar to the one used for the production of electric cables. In particular:

The emitter, without being cylindric, has no particular shape (FIG. 10, FIG. 11, FIG. 12) and comes with auto-adjusting section or not. This shape, whichever it may be, is firmly attached to a part of the pipe wall which is locally inflated and the emitter does not need to take up all the periphery of the duct or a large part of it, as in the known systems of FIG. 1, FIG. 2, FIG. 5, FIG. 6, which would result in waste of material. Our emitter may be composed of one or more fitted parts. In its auto-adjusting version, the water is entered in the emitter through an inflow aperture 1 (FIG. 10,1, FIG. 11,1) and a filter. Then, the water goes through the meandering stroke 12, FIG. 18, FIG. 19 and from there to the enlarged chamber 11 for the final flow adjustment and to the outflow end-tube 2. As in all known systems with auto-adjustment, this system may have the usual elastic mebrane 5 (FIG. 10,5, FIG. 11,5) which covers the meandering stroke and the enlarged chamber 11 for the final flow adjustment (FIG. 18,11, FIG. 19,11). Achieving, with the aid of a mebrane, constant outflow regardless of the inflow pressure is a known technique used in all the applications of fluids. The one surface of the membrane is exposed to area 19, the water inflow pressure from the tube (high pressure) and the other one covers the meandering stroke 12 and the final flow adjustment chamber 11 FIG. 18,11, FIG. 19,11 (low pressure). The more the water inflow pressure in area 19 (high pressure) is increased, the more the elastic membrane is pressured and closes the meandering stroke 12 and the water outflow aperture 4, at the enlarged chamber 11 for the final flow adjustment in the area of low pressure of the emitter. Thus, the cross-section passage is decreased, while the velocity of the water is increased, resulting in the final supply being constant (FIG. 31). At the external surface of the emitter, there is an elevated end-pipe 2 for the outflow of the water which projects for the easy detection and the automatic hole perforation on the duct, as we will describe furtherdown. Moreover, the solution of the elevated end-pipe 2 on the emitter permits us to eliminate the final outflow chamber 21 on the emitter, which permits the decrease of the total height of the emitter at the level of this chamber. This decrease, as it appears from the comparison of FIG. 10, FIG. 11, FIG. 12 with FIG. 26, FIG. 27, FIG. 28, is of the order of 20–25%, which is very important for the minimalisation of hydraulic resistances of the water in the duct and the problems of detachment of an emitter with large volume and height and projects in the interior of the duct. Apart from that, the elevated end-pipe 2 provides by itself a more stable support for the emitter at the pipe wall and full isolation of the areas of the emitter with atmospheric pressure from the interior of the duct which has high pressure.

The emitter 38, as a single part, in order to pass in the duct, slips with the aid of a pusher 13 on a driver 15 which passes from the interior of the angular head 14 of the extruder FIG. 29, FIG. 30. This can be done with only the pusher 13 of the supply mechanism, again through the angular head of the extruder or by simple injection. When a part of the emitter 39 comes into contact with the interior wall of the warm tube 39, the emitter is attached, taken over by the duct and moves horizontally to the projection of the duct and vertically to the axe and the cylindric cross-section of the duct, making the warm pipe wall swell at the point of contact and subside covering the whole of the emitter. This motion may be achieved by forming an inclined level 40 at the continuance of driver 15. Instead of the inclined level 40 which is stable, a kinetic system may be used for the movement of the emitter towards the wall of tube. The diver 15 obtains again horizontal surface 41, after the inclined level 40, so as the emitter 38 is compressed outwardly for a period of time towards the warm tube wall 39, swelling the duct and stabilising the adhesion. This swelling is local and assymetrical (FIG. 11, FIG. 12, FIG. 13) and does not interrupt the continuance of the duct. The contact of the emitter with the duct may take place anywhere, eg right after the head 14, before or in the configuration systems. Then, the duct may pass through other cooling baths or systems of external or internal configuration (calibers). There, taking advantage of the phenomenon of ray shrinking during the cooling, we achieve full cover of the emitter 38 from all sides and a large attachment surface. This makes detachment impossible and, at the same time, fully isolates the areas of high and low pressure of the emitter, in contrast with the disadvantages of the dripline duct of the type of FIG. 3 and FIG. 4, where the attachment is done only along a thin closed line. Because the emitter is well attached, there is no need to be extended to an arc larger than ⅓ of the periphery of the duct, with important saving of material. The duct exits continuous from the configuration systems, with apparent but asymmetrical swellings in the points where the emitters are attached, having a free internal cross-section along its length (FIG. 10, FIG. 11 and FIG. 12). At the same time, there is achieved an ideal and stable attachment compared to the other systems. Then, the emitter is constantly attracted by the puller, passes through the cutter and ends in the coiler. At this point, we should mention that, between the cooling bath and the puller, at the production lines of the known dripline ducts with constant cross-section and internal emitters, there is the complex arrangement of detection and identification of the position of the internally placed emitters. This arrangement gives the order to the complex and totally synchronised perforator for the perforation of the aperture or apertures for the ourflow of the water from the internal emitter. These arrangements of perforation and synchronisation increase the cost very much and can be omitted from our production line for the following reasons:

Due to the localised swelling created at intervals in the duct and due to the final position of the emitter, the detection can be easily done with a simple taster, as we describe below.

Our dripline duct does not have contant and symmetrical cross-section along its total length, our emitters, due to this originality, can easily have an elevated end-tube 2 for the outflow of water (FIG. 10,2, FIG. 11,2, FIG. 12,2). The end-tube 2, at the entrance of the emitter in the duct, is furtherly entered in the wall of the warm tube and projects. A simple stable cutting plate 42, installed in some point of the production line (FIG. 21,42, FIG. 22,42) is continuously turning at constant height on the passing tube and selectively cuts only the points that project, namely, in this case, the edges of the end-tubes 2 for the outflow of water and probably some part of the duct (FIG. 20,2, FIG. 21,2, FIG, 22,2). Moreover, the presence of the end-tube 2, which, before its cutting, may be closed or open or of open cross-section, permits the direct entrance and exit of the drip without its licking on the duct (cf FIG. 25).

Another substabtial advantage of our method is that, apart from the typical emitter described in FIG. 10, FIG. 11, FIG. 12, innumerous successful emitters may be entered, with possibility of external attachment to the duct. In FIG. 13, FIG. 14 and FIG. 15, there is a similar application with a successful emitter of cylindric shape. The emitter, at its basic manufacture, has the shape of FIG. 16. If we eliminate the fragile attachment end-tube 7 (FIG. 16,7) which is not needed anymore, and is left with the shape of FIG. 17, it can be easily entered in the duct by our system (FIG. 13, FIG. 14, FIG. 15) and can be very well exploited.

Other advantages:

Because the emitter does not take over all the periphery of the duct, but only a small part of it equal to ¼ of its periphery, our dripline duct may be slightly pressed at its passing from the puller, at the phase of its production, and coiled stretched without the risk of detachment of the 15 emitter. Thus, the volume of packaging and the trasport costs are substantialy decreased.

Because our emitter is not cylindric, namely it does not take over all the internal periphery of the duct, and because it is totally covered by the wall of the duct, swelling it asymmetrically, it can be used as it is, without changing for the diameters and thicknesses of the ducts, eg $\phi16$, $\phi17M$ $\phi20$ mm, with important saving in moulds etc. In all other cases of the internally attached emitters, cylindric or not, eg FIG. 1, FIG. 2, FIG. 3, FIG. 4, FIG. 5, FIG. 6, when the diameter of the duct where they will be attached changes and, in some types, when the thickness of the wall of the duct changes, the mould for the manufacture of the emitter should also change. This is the case because the curve radius of the duct changes which should always be the same with the curve radius of the emitter. In all these cases, the surface of contact of the emitter is a full cylinder or part of a cylinder. In our case, the curve of our emitter (there is no curve radius with the strict sense of the word) has no relation to the diameter of the duct. The duct is swollen at the point of attachment and obtains the shape of the emitter anyway.

Moreover, because our emitter is neither cylindric nor symmetrical, the internal water pressure pushes it and retains it on the wall, instead of detaching it, as is the case with the cylindric emitters.

Because our dripline duct is externally smooth, it does not present mechanical friction or resistance friction or problems in assembling, pulling and coiling by mechanised reels.

The interior of the duct remains completely free from shapes which could present hydraulic resistance or resistance of any kind and decrease of water pressure. Thus, it can irrigate with maximum uniformity and can have the maximum length of application allowed compared to any other dripline duct with the same duct diameter and water supply. Let us examine a dripline duct of ours with external diameter 16 mm, thickness 1.0 mm, supply 3.5 lit/h per emitter and intervals of emitters 0.30 mm. (Namely, the same characteristics with the example of page 4, where a dripline duct of the type of FIG. 3 and FIG. 4 is described). Here the application length is 100 m and we calculate the pressure decrease. In the case of our dripline duct, the classic type of Hazen-Williams is applied for the calculation of pressure losses in a smooth plastic tube with 330 outflows. (This is the number of outflows corresponding to a duct of a length of 100 m).

$$J = 1.128 \cdot 10^{12} \cdot \left(\frac{Q}{C}\right)^{1.852} \cdot d_{ESOT}^{-4.87} [\%]$$

$$J_N = J \cdot F \text{ where } F = \frac{S_i^N (i^{1.85})}{N^{2.82}}$$

$$Q = Lit/s$$

$$C \cong 150$$

$$N = \text{outflows.}$$

The decrease of the water pressure in this length or the pressure difference Jn of the water at its entrance in the first and last emitter, is of the order of 10 m WC only?? Namely, 4 times inferior to the respective case of the example of page 4, where the respective difference is 40 m WC.

Generally, its manufacture is cheaper and simpler and the attachment of the emitter is more reliable than all the respective known systems.

Other version:

In another version, our emitter, due to the variety of its shapes, may not be totally sinked in the interior pipe wall. But only in part, swelling respectively the duct. The remaining lower part of emitter may slightly project in the interior of the duct.

In another version, the meandering stroke 12 could be omitted and the membrane 5 could cover only the final adjustment chamber 11 and the outflow aperture 4.

Moreover, the internal surface of the dripline duct in the area of the local swelling may co-operate more directly with the attached emitter and constitute, at the same time, part of the substantial functioning space of the emitter, such as eg one of the surfaces of the channel of the meandering stroke for the adjustment of supply etc, decreasing the total height of the emitter.

Moreover, our emitter, instead of being attached internally in the duct, could be attached and simultaneously sinked in the wall of the plastic band, cause local swelling in order to cover the emitter, the surface of the band being once again free and flat. The width of the band corresponds to the diameter of the duct we select. Then, the band is coiled in a shape of closed cross-section, with obvious edge or not, and is attached at its edges along the length (FIG. 23, FIG. 24, FIG. 24a), simplifying very much the method of manufacture of the basic duct.

In another version, the emitter may not have the elevated end-tube 2. But only the membrane 5, meandering cross-section 12 or cross-section of another shape, final adjustment 11, water outflow aperture 4 and outflow chamber 21. This chamber is surrounded by the elevated crater 20, FIG. 26, FIG. 27, FIG. 28. In more simplified versions, the mechanism of the membrane 5 may be omitted, which is used for the automatic adjustment of water supply, the final adjustment chamber 11 and other parts.

We will mention an alternative of the method for the manufacture of our dripline duct FIG. 32 and FIG. 32a. The emitter 38 is simply ejected in the interior of the produced duct 39 in an angular head and is initially slightly attached at its fall on the warm duct. Then, the emitter 38 is driven with the duct by an inclined level 40 or a kinetic mechanism of the internal driver and moves outwards and horizontally on the one hand and vertically and ray-like on the other, swelling the duct 39 which covers it.

At this point, we will mention a method for the manufacture of a dripline duct with constant cross-section, FIG. 3, FIG. 4, FIG. 5, FIG. 6, which does not belong to the area of our invention. The method is shown in FIG. 33 and FIG. 33a in two stages.

The emitter 38 is not linearly accelerated in order to achieve a particular velocity eg V3 of the entrance of the duct 39 in the configuration 43, but is simply ejected in any velocity V and at any point between the extruder head and caliber in the interior of the produced duct in the angular head. Where it is initially slightly attached in the interior of the duct. The linear velocity V2 of the duct at the point of contact with the emitter and the velocity V of the emitter itself may be whatsoever and is not connected with the linear velocity V1 at which the produced duct exits from the head 14 of the extruder, or the linear velocity V3 at which it enters in the configuration system (caliber) 43. Simply, if V1<V3, then V1<V2<V3, while if V1=V3, then V1=V2=V3. The emitter 39 then enters with duct 39 in the configuration system 43, always moving towards the production of the duct, where it is compressed between the internal driver 15 and caliber 43 and attached on one of its surfaces on the internal surface of the warm duct with continuous to have constant cross-section. The attachment of the emitter is not achieved by its simple and stable compression by the internal drier, but is also reinforced by palpitating, vibrating or percussioning movements 44 of the internal driver 15. These vibrating movements 44 permit to the emitter to be driven by the duct itself and pass without shocks between the stable caliber 43 and the driver 15 and to be compressed vertically to its movement between them, achieving better adhesion. This is due to the fact that, because of this vertical palpitating movement 44 of the driver 15 of part of it, the forces do not have constant intensity and the void between the driver 15 and the caliber 43 is increased and decreased all the time. Moreover, other methods may be used apart from the vibrations in order to achieve this periodical increase and decrease of the void between the driver 15 and the caliber 43. This decrease and increase of the void is connected with increase and decrease of the pressures on the emitter. Moreover, the emitter could be supported at its movement and additionally pushed by a pushing mechanism or the caliber itslef may perform palpitating movements.

The methods known to this day for the manufacture of dripline ducts with constant cross-section use complex systems for the acceleration of the emitters in order to achieve the particular V3 of the entrance of the duct to the configuration, as well as pushing mechanisms compressing the emitter between the driver and the caliber, in order to achieve its attachment. However, this method, apart from the fact that it increases the cost, presents other disadvantages as well. The contact of the emitter with the produced duct and the beginning of its attachment takes places at the beginning of the configuration, where the warm duct is violently disfigured being pushed externally by the stable caliber and internally by the cool emitter supported by the internal driver on which it slides and by the pushing mechanism which accelerates it up to this point and continuous to push it. At this exact point of disfiguration, the product duct "collides" with the stable caliber on which it is then pulled. At this point, the collision is violent enough because the produced ducts move at 30 m–50 m/1'. Due to these high velocities, the simultaneous action of many constant forces in minimum time, the simultaneous external sliding of the duct on the stable caliber and internal sliding of the emitter along the internal driver, the control of the productive procedure and the automatic co-ordination of the velocities of emitter entering and duct pushing are made difficult, bearing consequences on the quality of attachment.

This method of vertical palpitating movement 44 or vibration of the driver 15 may be applied to the methods of FIG. 29, FIG. 30, FIG. 32, FIG. 32a, in order to facilitate the sliding of emitter 38 on the surfaces 40 and 41 of the driver. Concerning the configuration system of the pipe of our dripline duct FIG. 10, FIG. 11, FIG. 12, this can be internal or external. Concerning the movement of the emitter at its contact and its covering by the pipe, this can be only horizontal or only vertical to the production of the duct.

DESCRIPTION OF FIGURES

FIG. 10 shows a cross-section of our dripline duct with locally swollen pipe without the elevated end-tube for the outflow of water. Even in the case where the elevated end-tube of outflow 2 is missing, the adhesion, the attachment and the isolation of the areas of low and high pressure of the water on the emitter is perfect.

FIG. 11 shows a longitudinal section of FIG. 10.

FIG. 12 shows a ground plan of FIG. 10 and FIG. 11.

FIG. 13 shows a longitudinal section of an alternative of our dripline duct with locally swollen wall and with the known cylindric emitter of FIG. 16 and FIG. 17, internally located and attached.

FIG. 14 shows a section of FIG. 13.

FIG. 15 shows a ground plan of FIG. 13 and FIG. 14.

FIG. 16 shows a simple known cylindric emitter for external attachment to ready duct.

FIG. 17 shows the same emitter of FIG. 16, where the special base (end-tube) is omitted for its external attachment and placement on the tube.

FIG. 18 shows a meandering stroke for increase of the water pressure decrease.

FIG. 19 shows another form of stroke for increase of the water pressure decrease.

FIG. 20 shows a longitudinal section of our dripline duct with locally swollen pipe, where the elevation of the end-tube for outflow of water is shown before it is cut.

FIG. 21 shows a cross-section of the dripline duct of FIG. 20 at the stage of cutting its end-tube.

FIG. 22 shows a ground plan of FIG. 21.

FIG. 23 shows a ground plan of a dripline duct of ours created by the attachment of the edges of a plastic band.

FIG. 24 shows a cross-section of FIG. 23.

FIG. 25 shows a drawing from the installation of a dripline duct on a surface of marked hypsometric differences, the drips of which are all assembled to the lowest point of its curve, regardless of the real point of their outflow.

FIG. 26 shows a longitudinal section of our dripline duct, without the version of elevated outflow end-tube, but with chamber for water outflow.

FIG. 27 shows a ground plan of FIG. 26 with the outflow chamber 21 and the outflow aperture 22.

FIG. 33 shows the simple ejection and the second one FIG. 33a the compression by the palpitating movement of the driver.

Figure 1:
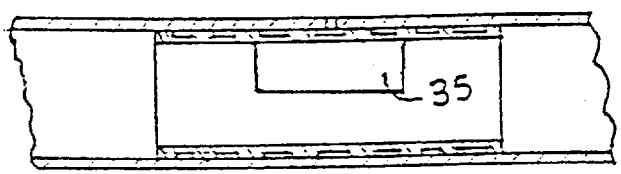
FIG. 1 shows one longitudinal section of a known dripline duct with cylindric auto-adjusting emitter.
Figure 2:
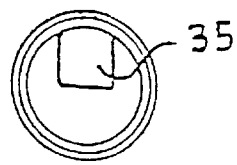
FIG. 2 shows a cross-section of FIG. 1.
Figure 3:
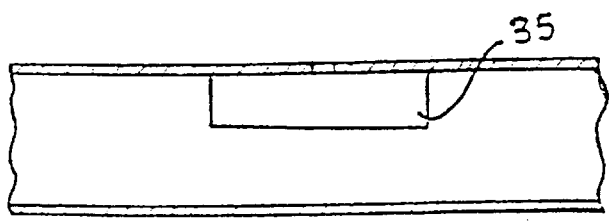
FIG. 3 shows a longitudinal section of a known dripline duct of constant cross-section with internally attached auto-adjusting emitter of small dimensions.
Figure 4:
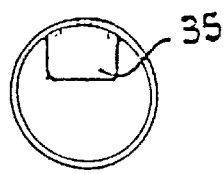
FIG. 4 shows a cross-section of FIG. 3.
Figure 5:
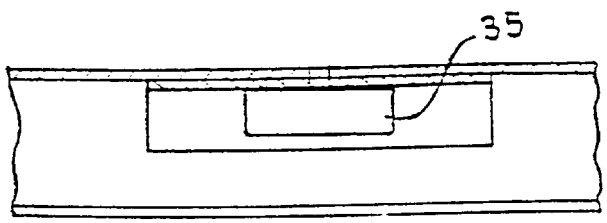
FIG. 5 shows a longitudinal section of a known dripline duct with internally attached auto-adjusting emitter.
Figure 6:
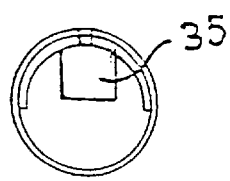
FIG. 6 shows a cross-section of FIG. 5.
Figure 7:
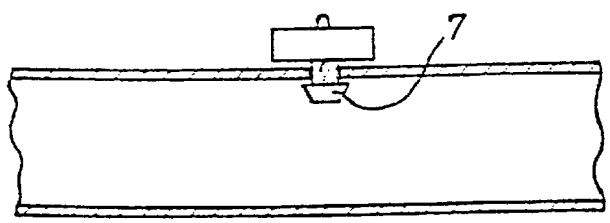
FIG. 7 shows a longitudinal section of a known dripline duct with emitter externally attached to the duct.
Figure 8:
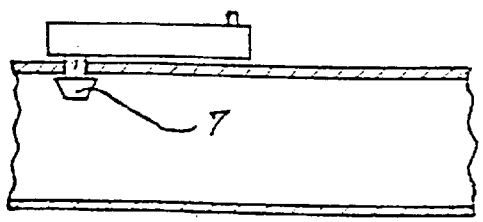
FIG. 8 shows a longitudinal section of a known dripline duct with emitters externally attached to the duct.
Figure 9:
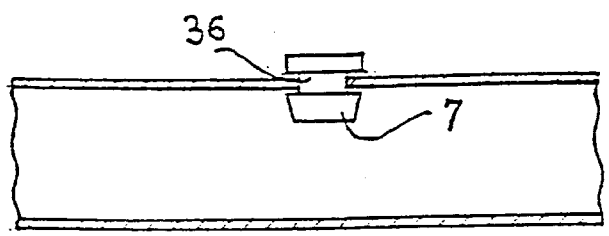
FIG. 9 shows a longitudinal section of a known dripline duct with auto-adjusting emitters of small dimensions externally attached to a ready duct.
Figure 24A:
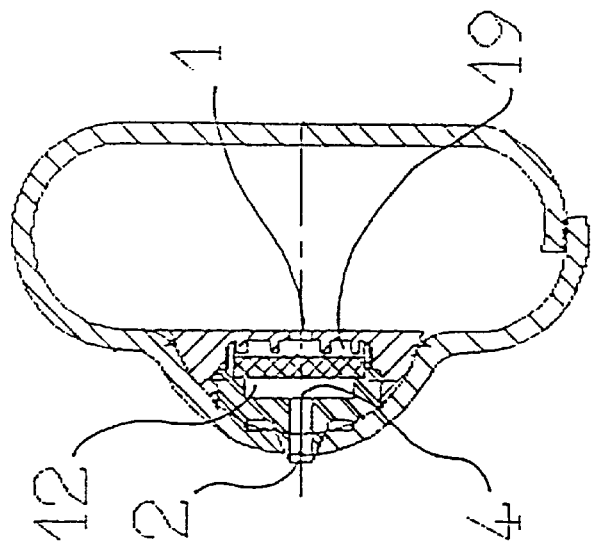
FIG. 24a shows a cross-section of the version of production of a dripline duct of ours, where the edges of the band cover each other so as no part of the edges be seen from the outside.
Figure 28:
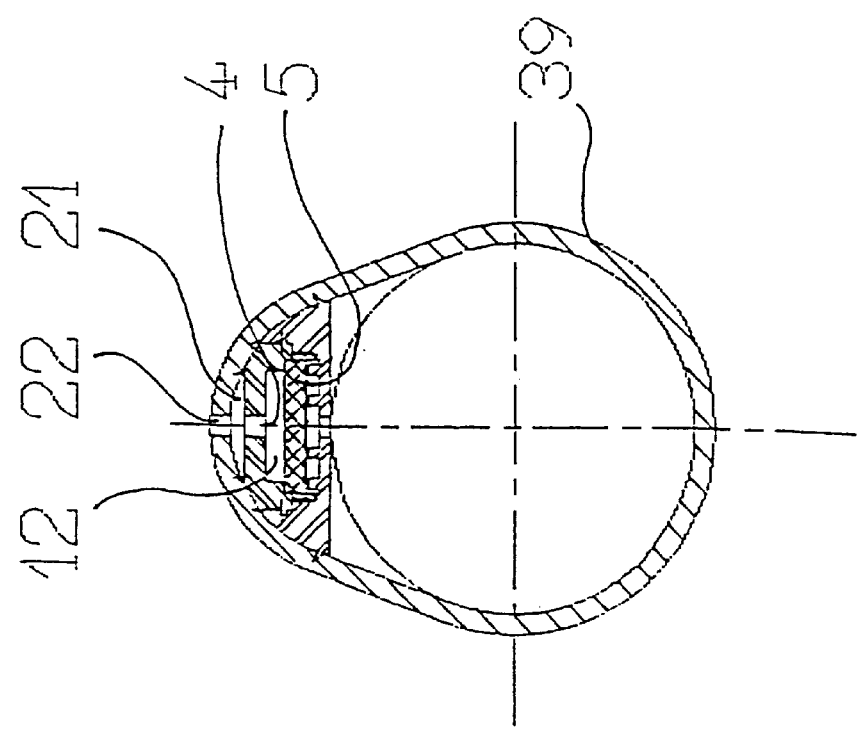
FIG. 28 shows a cross-section of FIG. 26.
Figure 29:
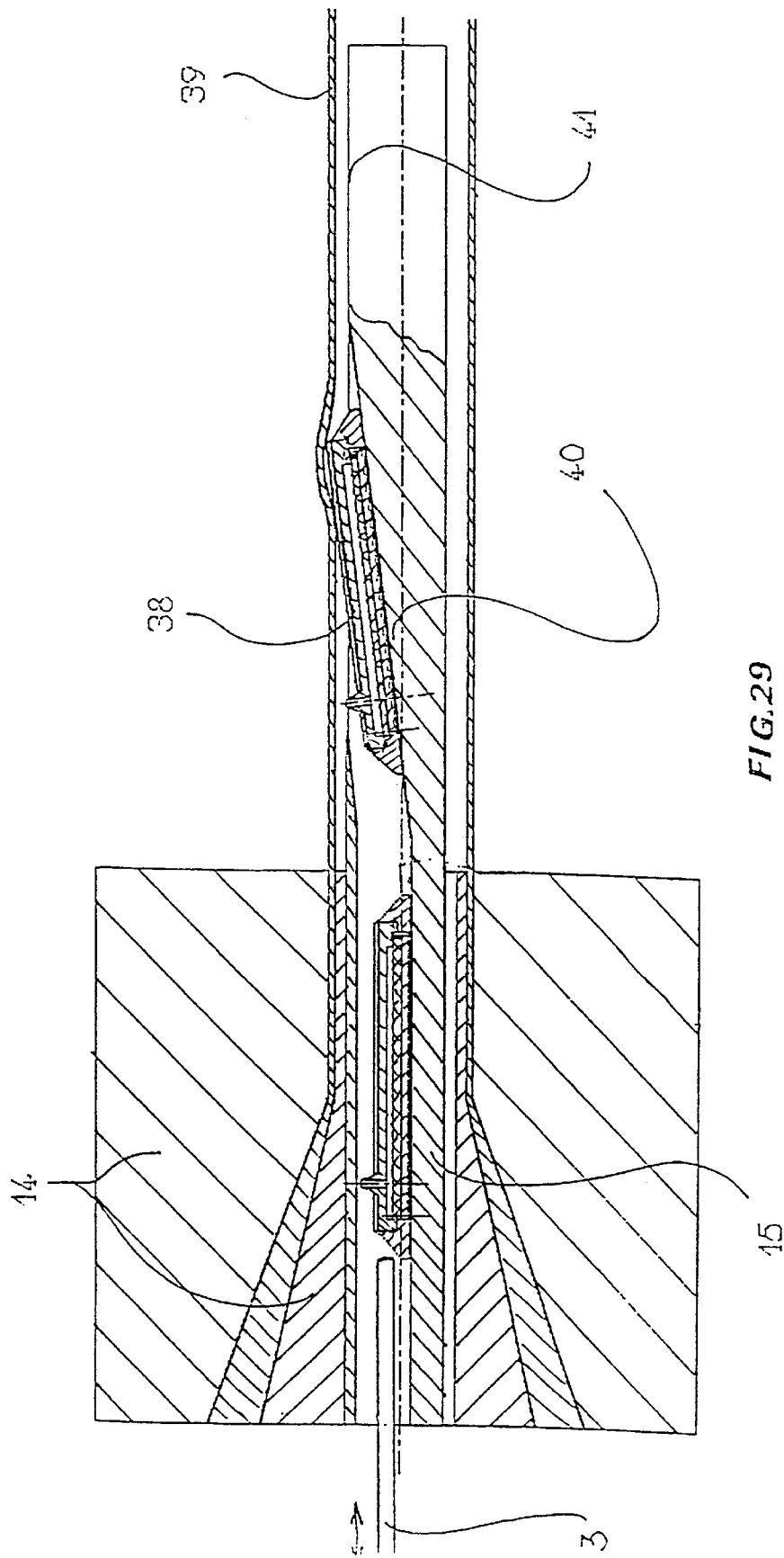
FIG. 29 shows one of the applications of the entrance of the emitter in the interior of the duct at its production phase and especially at the time when the emitter comes into contact with the wall of the duct.
Figure 30:
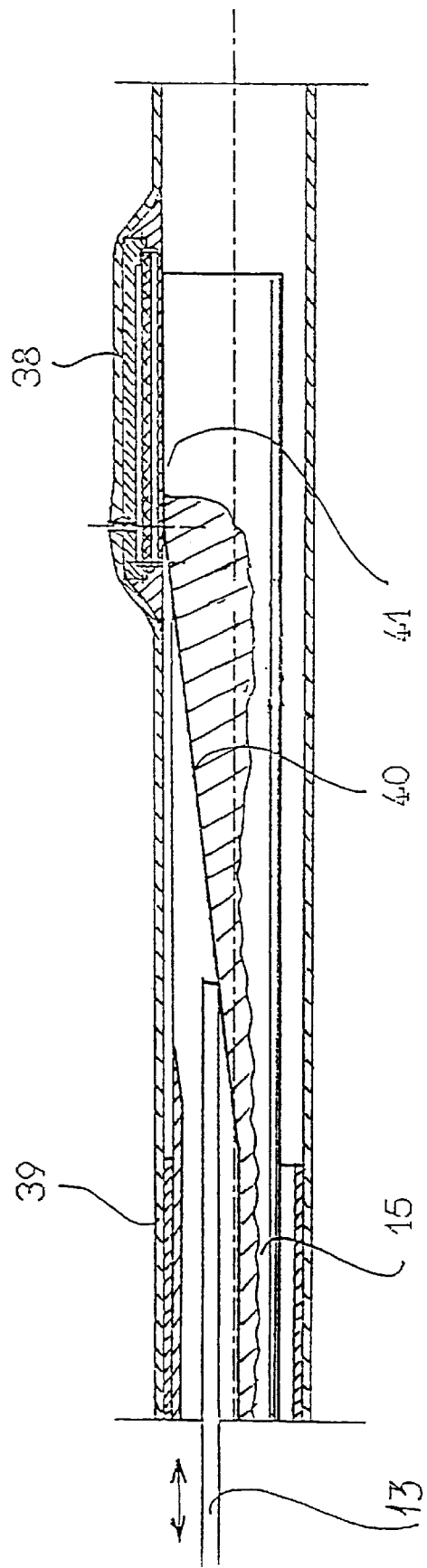
FIG. 30 shows the continuance of the application described in FIG. 29, when the emitter takes its final position and is firmly attached in the interior of the duct.
Figure 31:
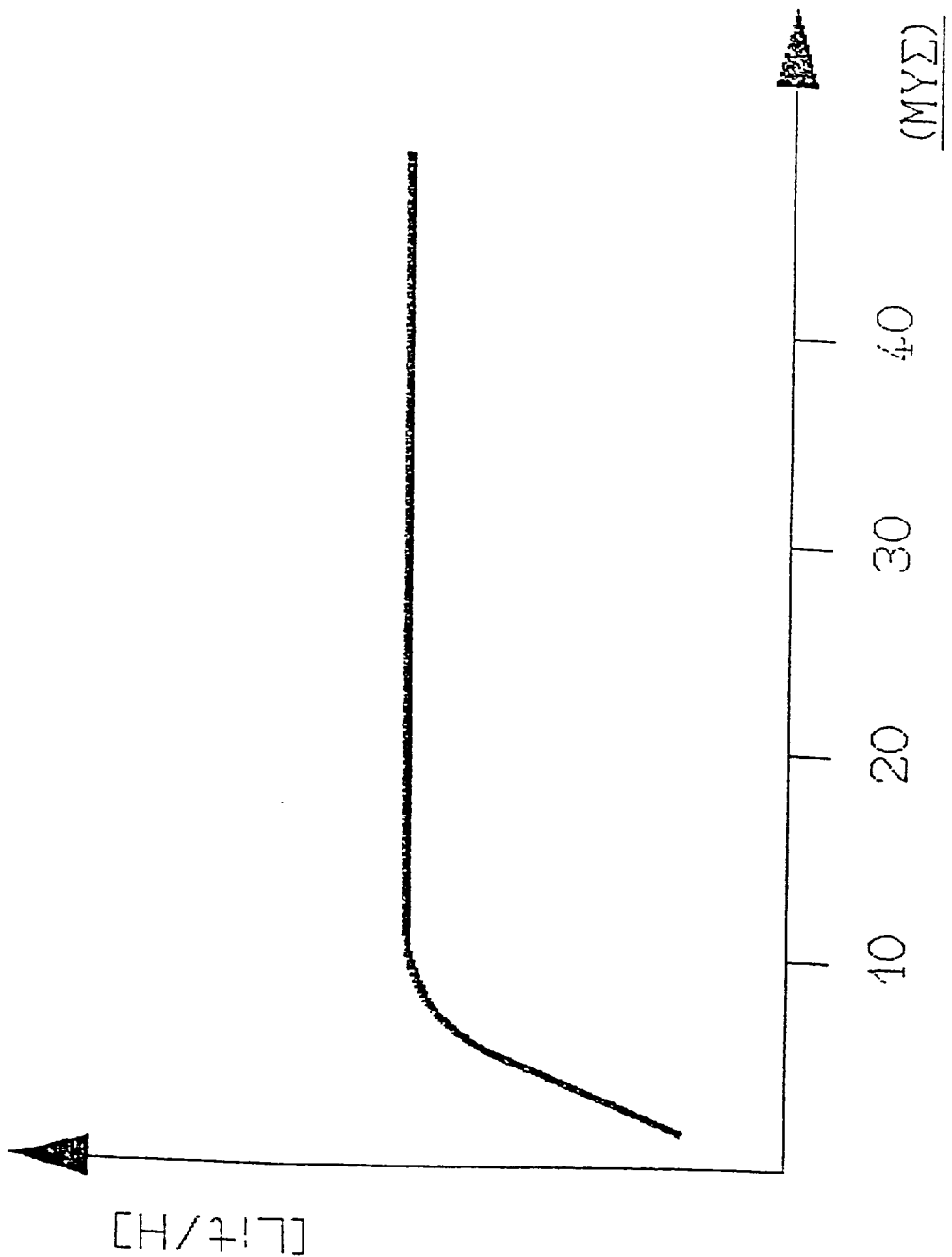
FIG. 31 shows the curve of supply of a auto-adjusting emitter in conjunction with the pressure of water in the tube.
Figure 32:
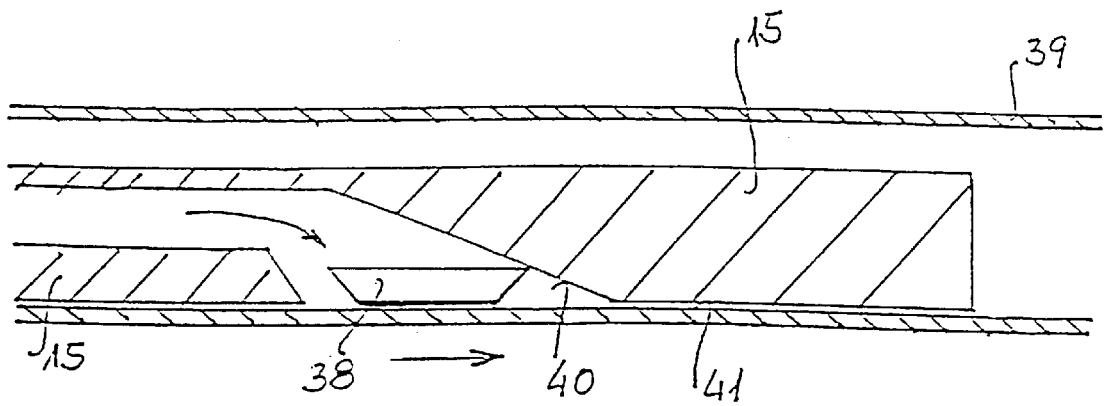
FIG. 32 and FIG. 32a shows one of the applications of the entrance of the emitter in the interior of our duct in two stages: the first stage shows the ejection of the emitter to the interior of the duct and the second one the local swelling of the duct and the covering of the emitter.
Figure 32A:
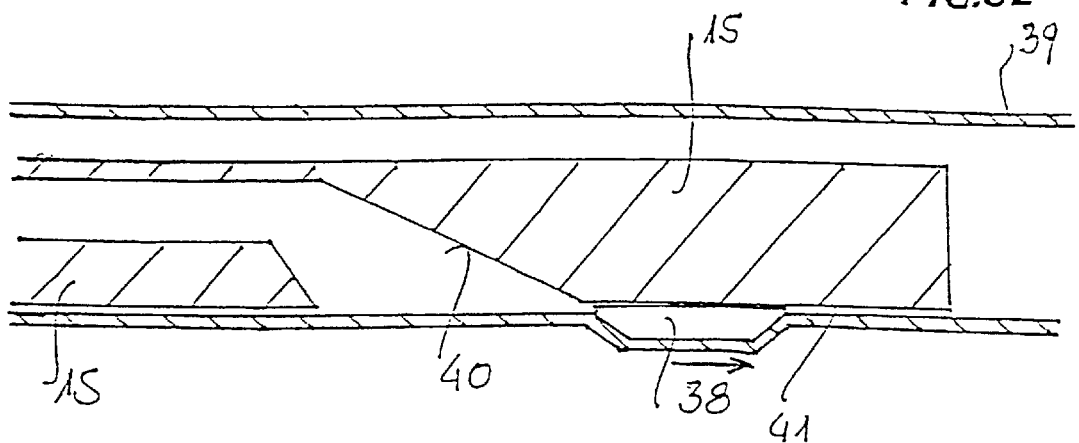
Figure 33:
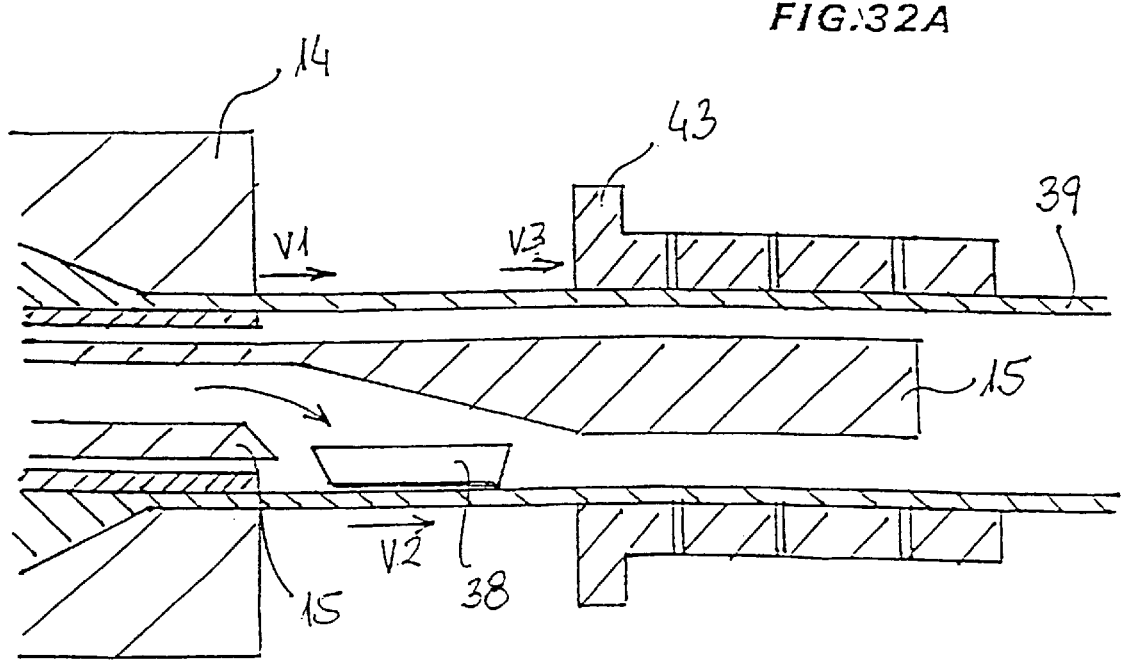
FIG. 33 and FIG. 33a shows one of the applications of our method for the entrance of the emitter is the interior of a dripline duct of constant cross-section, which however is not by itself the object of our invention. The first stage
Figure 33A:
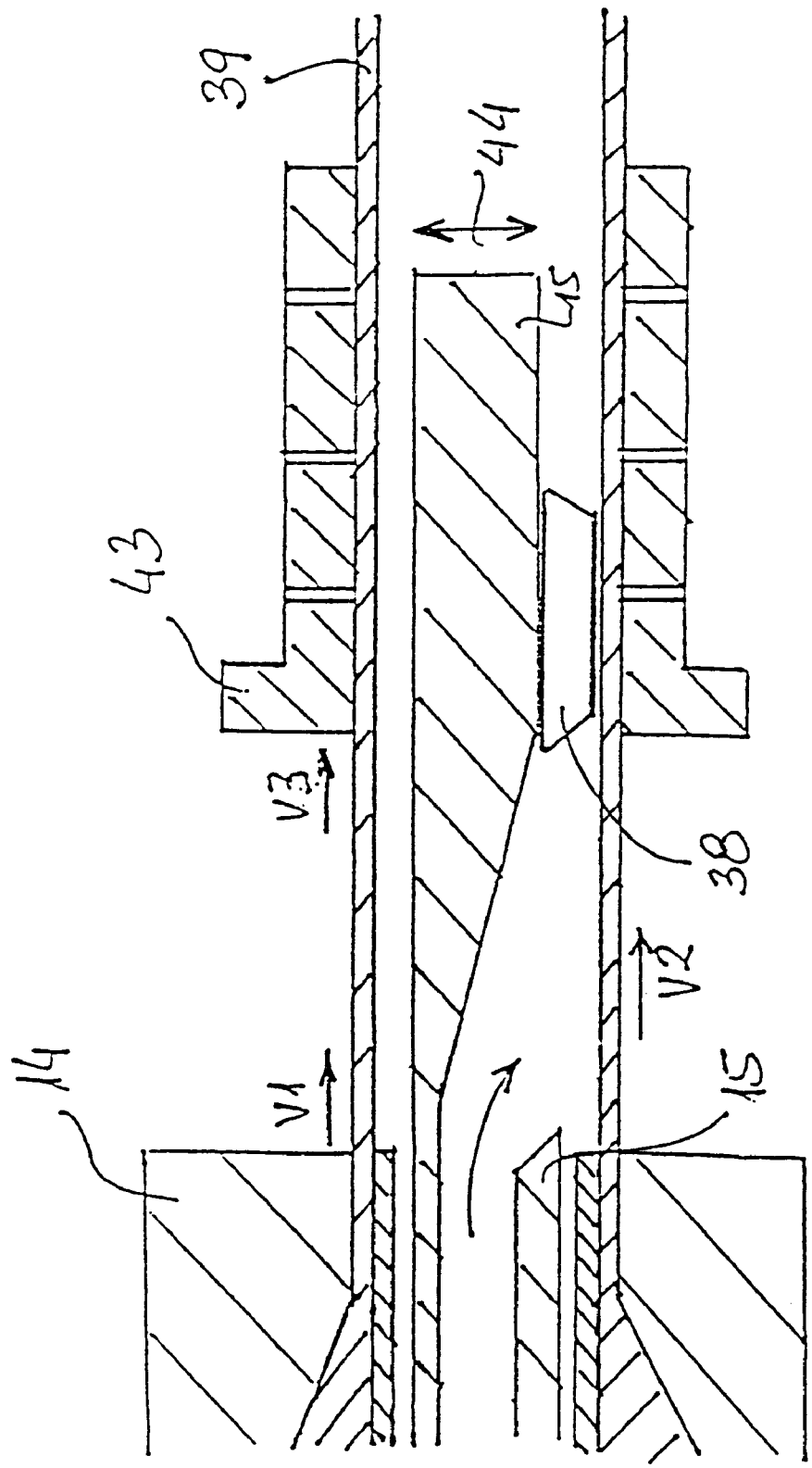

The drawings and applications in this description are indicative, in order to understand the idea of the invention. Thus, they do not constitute limitative elements concerning the sizes, the shapes and the several values.

I claim:

1. A dripline for irrigation, comprising:
   a continuous duct; and
   a plurality of discrete emitter units, wherein
   the duct has a wall with an outer surface and an inner surface, the inner surface of the wall defining a fluid flow line, and the duct has a plurality of discrete swells along its length, with each swell of said plurality of discrete swells extending in the longitudinal direction and with each swell of said plurality of discrete swells extending along an arc in the periphery of the cross-section of the duct, so that the cross-section of the duct at the area of each of said plurality of swells is asymmetrical, and apertures are further provided on the wall of the duct at the area of each of said plurality of swells, each emitter unit of said plurality of discrete emitter units is independent from the duct and comprises a body and a flow path, for the transportation of the fluid from said fluid flow line to the outer space, each emitter unit of each plurality of discrete emitter units is located at least partially within a swell and attached to the inner surface of the duct, and each emitter unit of said plurality of discrete emitter units is sunk at the inner surface of the duct during the production of the dripline, so as to form the swell wherein at least part of the said emitter unit is located.

2. The dripline according to claim 1, wherein the emitter is self compensating.

3. The dripline according to claim 1, wherein each swell of said plurality of discrete swells extend along an arc in the periphery of the cross-section of the duct, which arc does not exceed about 45 deg.

4. The dripline according to claim 1, wherein the duct has a seam along its length.

5. The dripline according to claim 1, wherein each emitter unit of said plurality of discrete emitter units is sunk at the inner surface of the duct during the production of the dripline, so as to form the swell wherein only a part of the said emitter unit is located.

* * * * *